(12) United States Patent
Lu et al.

(10) Patent No.: US 10,401,521 B2
(45) Date of Patent: Sep. 3, 2019

(54) CONTROL OF ACOUSTIC TRANSMITTERS FOR DOWNHOLE MEASUREMENT OR LOGGING

(71) Applicant: Halliburton Energy Services, Inc., Houston, TX (US)

(72) Inventors: Yinghui Lu, The Woodlands, TX (US); Daniel Viassolo, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 640 days.

(21) Appl. No.: 14/429,286

(22) PCT Filed: Feb. 20, 2014

(86) PCT No.: PCT/US2014/017481
§ 371 (c)(1),
(2) Date: Mar. 18, 2015

(87) PCT Pub. No.: WO2015/126407
PCT Pub. Date: Aug. 27, 2015

(65) Prior Publication Data
US 2016/0033663 A1 Feb. 4, 2016

(51) Int. Cl.
*G01V 1/40* (2006.01)
*G01V 1/52* (2006.01)

(52) U.S. Cl.
CPC . *G01V 1/40* (2013.01); *G01V 1/52* (2013.01)

(58) Field of Classification Search
CPC .................................. G01V 1/40; G01V 1/52
USPC ......................................................... 367/25
See application file for complete search history.

(56) References Cited

U.S. PATENT DOCUMENTS

| 4,345,502 A | * | 8/1982 | Jahns | ...................... | H03F 3/265 |
| | | | | | 330/264 |
| 4,718,046 A | | 1/1988 | Medlin | | |
| 4,796,237 A | * | 1/1989 | Hutchens | ................. | G01V 1/46 |
| | | | | | 181/105 |

(Continued)

FOREIGN PATENT DOCUMENTS

EP            0587405            3/1994

OTHER PUBLICATIONS

"An Introduction to Signals," Bucknell University Faculty and Staff, 2017, downloaded Apr. 22, 2017 from http://www.facstaff.bucknell.edu/mastascu/elessonshtml/Signal/Signal1.htm, 14 pages.*

(Continued)

*Primary Examiner* — Daniel L Murphy
(74) *Attorney, Agent, or Firm* — Benjamin Fite; Parker Justiss, P.C.

(57) ABSTRACT

The acoustic energy induced by a transmitter module of an acoustic logging tool is dependent on several factors. In some implementations, the induced acoustic energy is dependent on the electromagnetic energy input into the transmitter module, the response behavior of the transmitter module, and the operating conditions of the transmitter module. Variation in one or more of these factors can result in a corresponding variation in the induced acoustic. Thus, a desired acoustic signal can be produced by applying an appropriately selected input signal to the transmitter module, while accounting for other factors that influence the output of the transmitter module.

26 Claims, 9 Drawing Sheets

(56) References Cited

U.S. PATENT DOCUMENTS

| | | | |
|---|---|---|---|
| 5,542,001 A * | 7/1996 | Reiffin | H04R 3/002 |
| | | | 381/400 |
| 5,987,385 A | 11/1999 | Varsamis et al. | |
| 2003/0123326 A1 | 7/2003 | Wisniewski et al. | |
| 2010/0237819 A1 | 9/2010 | Binnard et al. | |

OTHER PUBLICATIONS

International Search Report and Written Opinion of the International Searching Authority issued in International Application No. PCT/US2014/017481 dated Dec. 11, 2014; 15 pages.

* cited by examiner

CONTROL OF ACOUSTIC TRANSMITTERS FOR DOWNHOLE MEASUREMENT OR LOGGING

CLAIM OF PRIORITY

This application is a U.S. National Stage of and claims the benefit of priority to International Application No. PCT/US2014/017481, filed Feb. 20, 2014, the contents of which are hereby incorporated by reference.

TECHNICAL FIELD

This invention relates to acoustic transduces, and more particularly to adjusting the input pulse driving an acoustic transducer in order to obtain a desired transducer response.

BACKGROUND

Wells are commonly used to access regions below the earth's surface and to acquire materials from these regions. For instance, wells are commonly used to locate and extract hydrocarbons from underground locations. The construction of wells typically includes drilling a wellbore and constructing a pipe structure, often called "casing," within the wellbore. Upon completion, the casing provides access to the underground locations and allows for the transport of materials to the surface.

Before, during, and after construction of a well, a variety of tools may be used to monitor various properties of the downhole environment. For example, underground acoustic logging systems may be used to inspect a casing, the surrounding cement support structure, and/or the surrounding subterranean formations. These systems may be positioned independently within a wellbore, or may be placed on a drill string and positioned within the wellbore in conjunction with other downhole equipment. Acoustic logging systems typically include a transmitter that directs acoustic energy towards the periphery of the wellbore, and a receiver that detects acoustic energy reflected back to the logging system (e.g., acoustic energy reflected from the casing and/or from the subterranean regions beyond the wellbore. Based on the measured reflections, the monitoring system provides information regarding the casing and its surrounding environment.

DESCRIPTION OF DRAWINGS

Like reference symbols in the various drawings indicate like elements.

DETAILED DESCRIPTION

This disclosure describes several example implementations for controlling a response of an acoustic transmitter in an acoustic logging system by adjusting a drive pulse applied to the transmitter module. One or more of the described implementations can be used to provide acoustic energy with desired characteristics, reduce undesired characteristics in the produced acoustic energy, or adjust the operation of the transmitter module in response to static or dynamic changes.

Figure 1A:
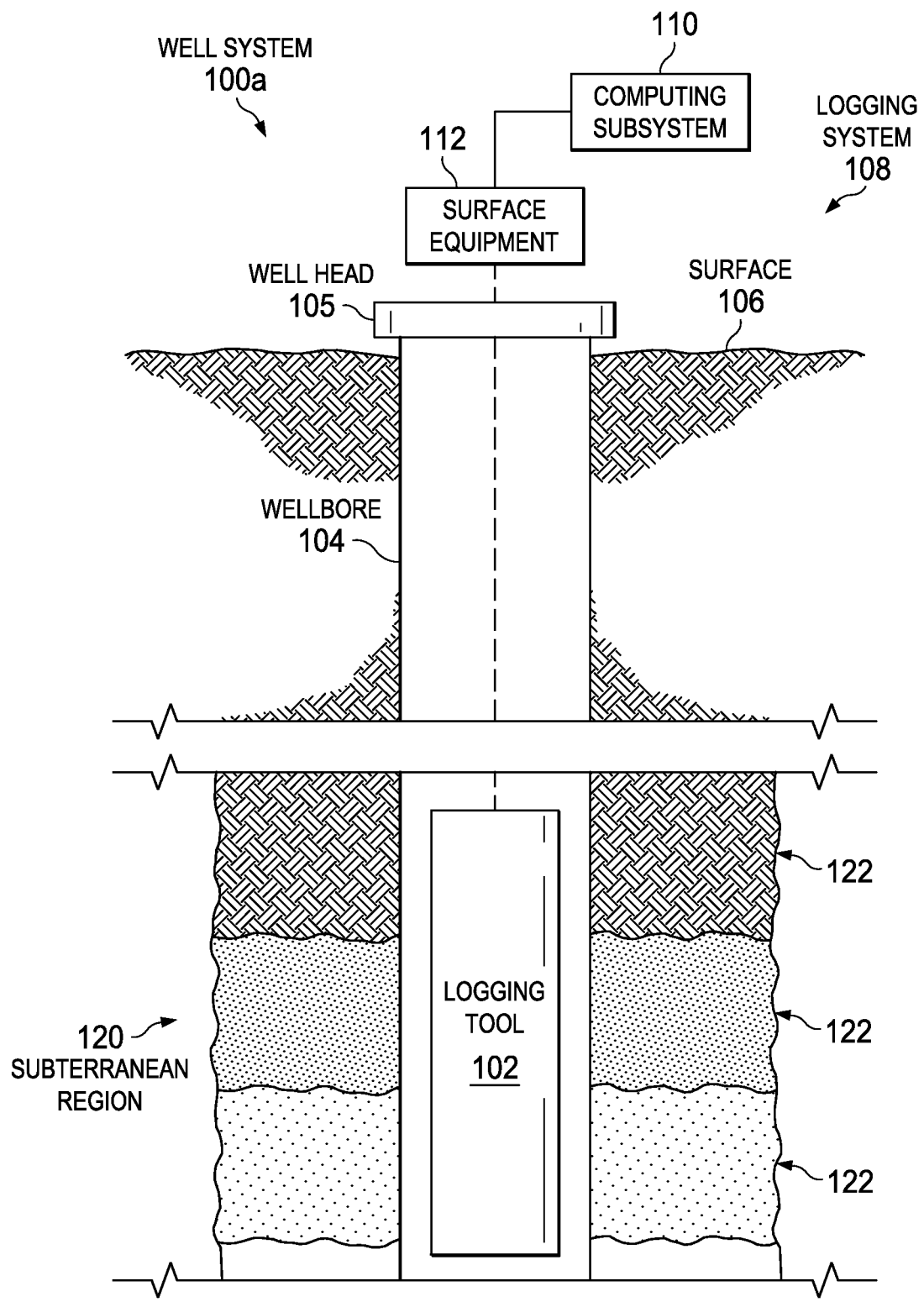
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrating through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of an logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100*a* can include communication or telemetry equipment that allows communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
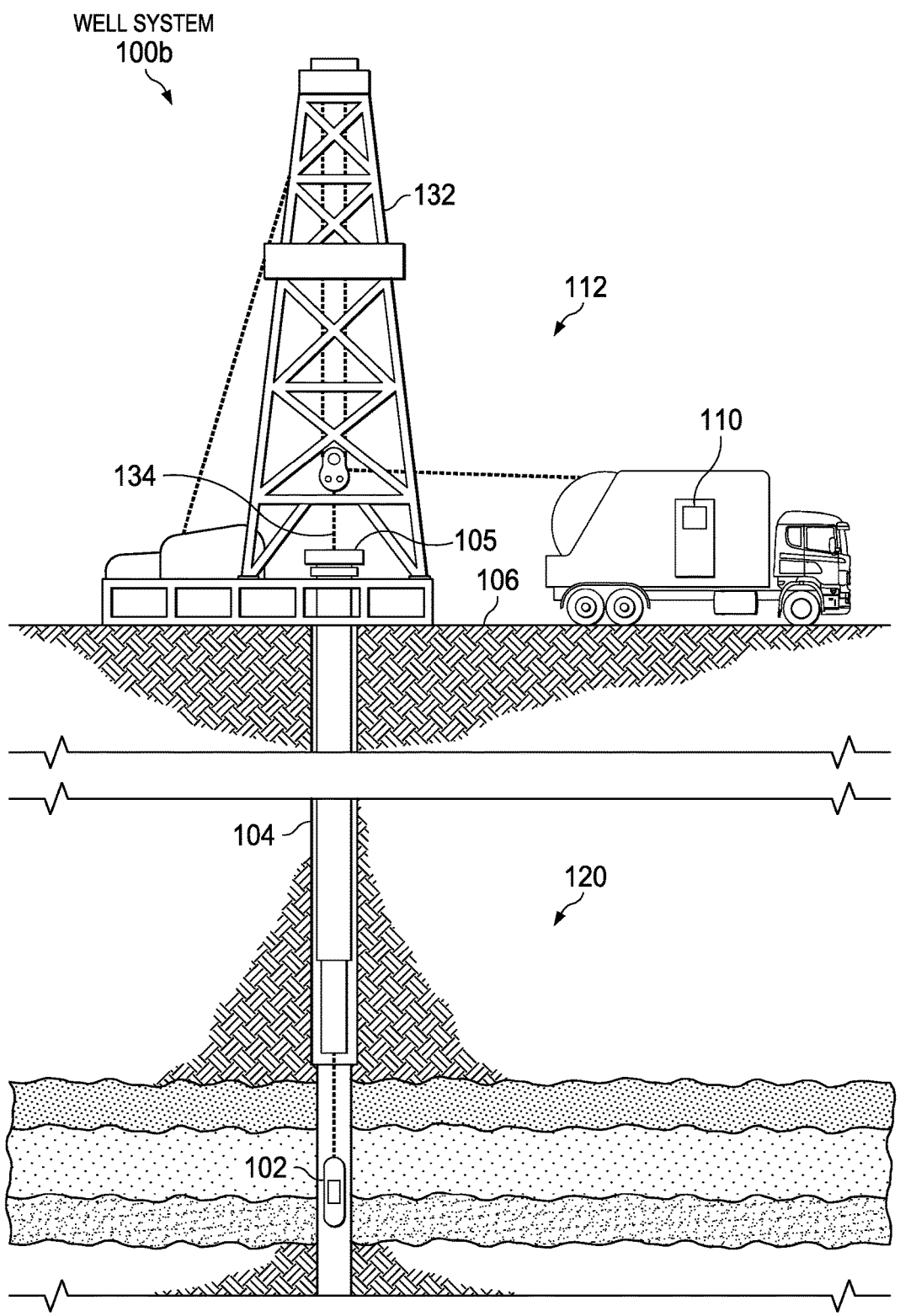
FIG. 1B is a diagram of an example well system that includes a logging tool in a wireline logging environment.

In some examples, logging operations are performed during wireline logging operations. FIG. 1B shows an example well system 100*b* that includes the logging tool 102 in a wireline logging environment. In some example wireline logging operations, a the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
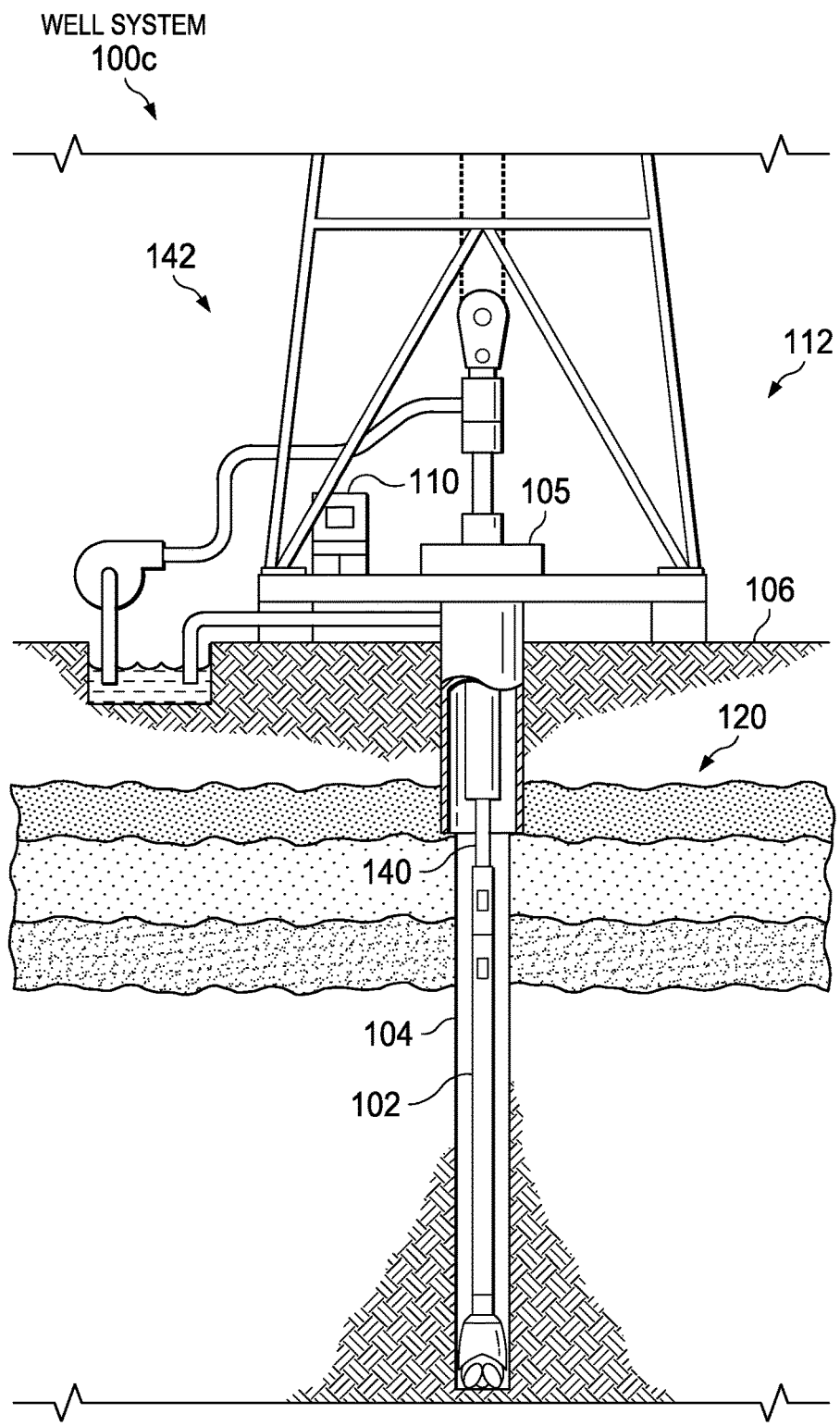
FIG. 1C is a diagram of an example well system that includes a logging tool in a logging while drilling (LWD) environment.

In some examples, logging operations are performed during drilling operations. FIG. 1C shows an example well system 100*c* that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill the wellbore 104 to penetrate the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

Figure 2:
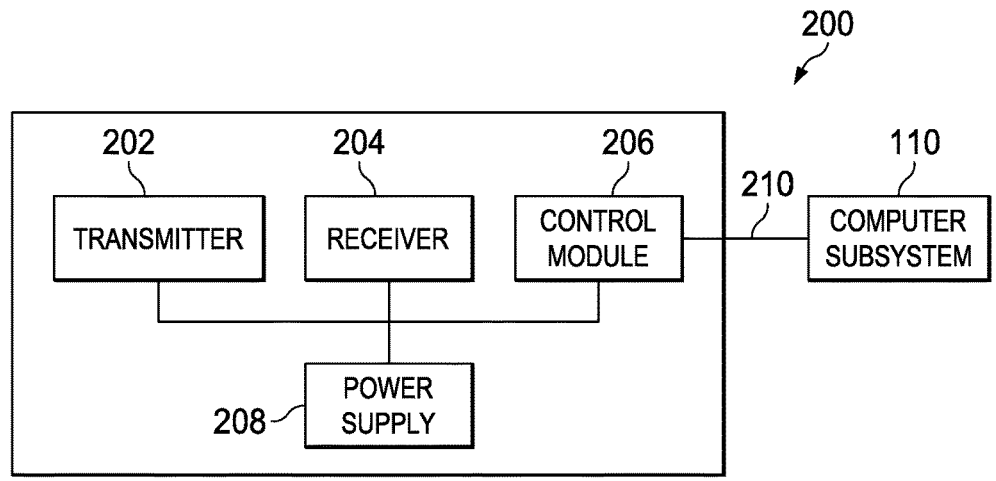
FIG. 2 shows an example acoustic logging module.

In some implementations, the logging tool 102 includes an acoustic logging module 200 that monitors the downhole environment through the use of acoustic energy. An example acoustic logging module 200 is shown in FIG. 2. In this example, acoustic logging module 200 includes a transmitter module 202, a receiver module 204, a control module 206, and a power supply 208. Processing module 106 is connected to the computer subsystem 110 control station 110 through a signal connector 210.

Figure 3:
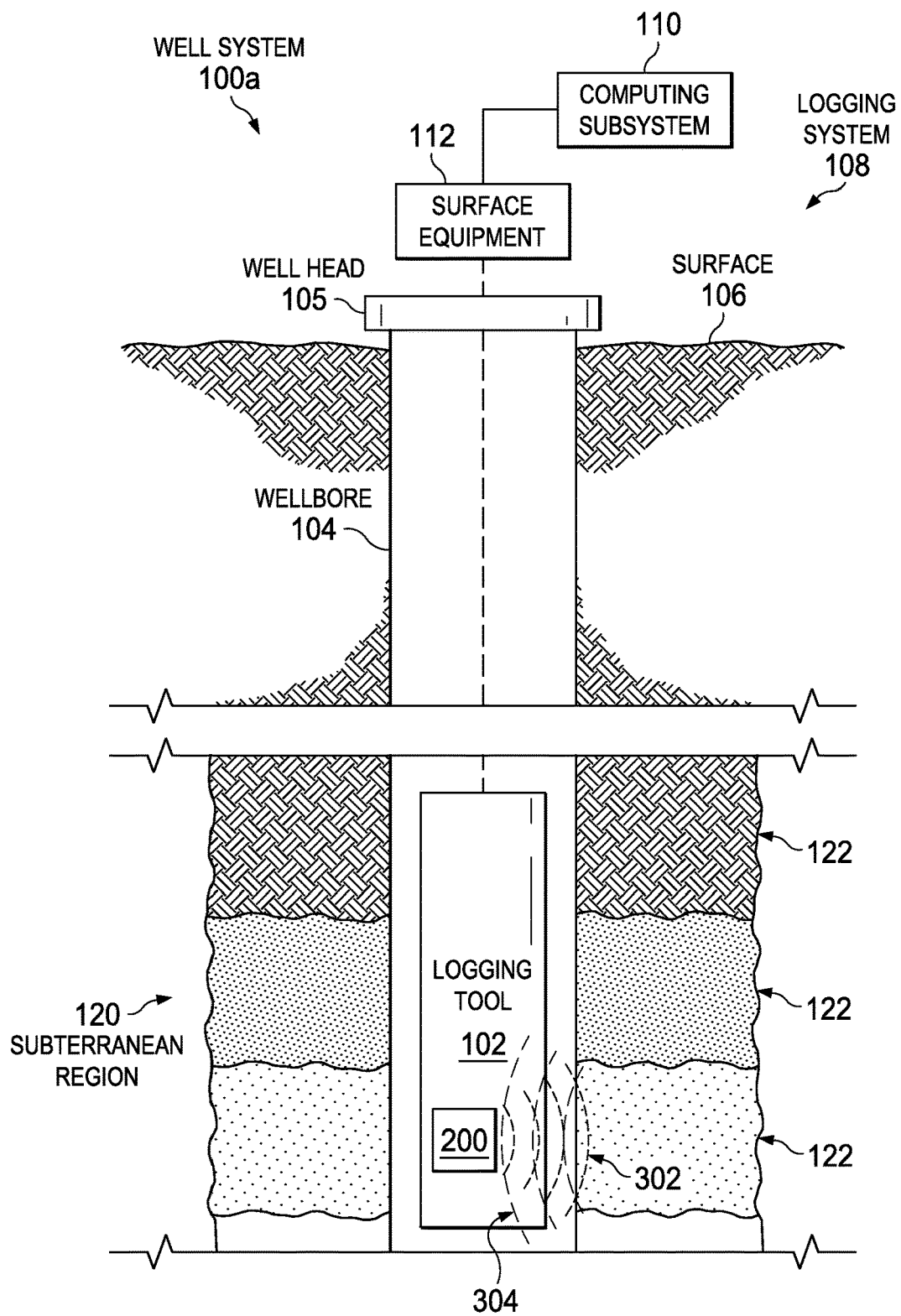
FIG. 3 shows an example usage of an acoustic logging module.

Referring to FIG. 3, during an example monitoring process, an operator lowers logging tool 102 within the wellbore 104, and oversees the monitoring process from the surface 106 using computer subsystem 110. When logging tool 102 is positioned proximate to a region of interest, transmitter module 202 of acoustic logging module 200 directs time dependent acoustic energy 302 radially towards the periphery of wellbore 104, and receiver module 204 measures acoustic energy 304 that returns to logging tool 102. Processing module 206 amplifies, digitizes, and analyses the measurements of energy 304 to produce an acoustic log of the examined region. An acoustic log can include, for example, information regarding the transit time of the acoustic energy between the transmitter module 202 and the receiver module 204, one or more waveforms describing the amplitude, frequency, and other characteristics of the reflected acoustic energy, and other information related to the reflection of acoustic energy from the examined region. Acoustic module 200 transmits the acoustic log and other information related to the monitoring process, including signal measurements and operational feedback, to computer subsystem 110. The operator interacts with computer subsystem 110 to review the acoustic log and other monitoring information, and adjusts the operation of logging toll 102 and acoustic logging module 200 as desired. Operator commands are transmitted back to acoustic logging module 200 through signal connector 210.

Transmitter module 202 can be a transmitter capable of providing acoustic energy in a desired frequency range (e.g., 50-500 kHz) and at a sufficiently high amplitude under the conditions typically encountered in down well environments (e.g., at high temperatures, such as temperatures in excess of 170° C., and at high pressures, such as pressures greater than 20,000 psi). For example, transmitter module 202 may include an ultrasound transducer that is capable of providing acoustic energy at approximately 50 Hz to 500 kHz.

Receiver module 204 can be a receiver capable of detecting acoustic energy in the desired frequency range under the conditions typically encountered in down well environments. In general, the transmitter and receiver are made of piezoelectric materials. For example, in some embodiments the transmitter module and receiver module include piezoelectric elements that are made, in part, of lead-zirconate-titanate (commonly referred to as PZT) or lead magnesium niobate-lead titanate (commonly referred to as PMN-PT) ceramic materials. In some embodiments, the transmitter module and the receiver module may share the same piezoelectric element. In some embodiments, the transmitter module and receiver module may further include a highly attenuated block to support the piezoelectric element, in order to improve the transmitter and receiver response. This attenuated block may be made of various materials, for instance a tungsten and rubber composite. The attenuated block and the piezoelectric element may be encapsulated within an envelope, forming a completed transducer. Receiver module 204 and transmitter module 202 may be located at approximately the same location on logging tool 102 (e.g., so that acoustic energy is transmitted and detected from the same depth during operation of logging tool 102) or at different locations on logging tool 102 (e.g., so that acoustic energy is transmitted and detected from different depths during operation of logging tool 102), depending on the implementation.

In some implementations, portions of acoustic logging module 200 may be located on the surface 106, such as within or in proximity to computing subsystem 110, or elsewhere in system 100. For example, in some implementations, power supply 208 can be located on the surface 106 and in proximity to computer subsystem 110, and can supply power to acoustic logging module 200 through connector 210 or another connector that runs from the surface 106 to the logging tool 102. In another example, processing module 206 can be located on or near the surface 106, and can be either in proximity to or integrated with computing subsystem 110. In these implementations, operational signals, measurement signals, and/or power can be transmitted between transmitter module 202, receiver module 204, and power supply 208 through connector 210, or through another connector that runs from the surface 106 to the logging tool 102.

In some implementations, acoustic logging module 200 stores raw or processed measurement signals for future retrieval by processing module 206, computing subsystem 110, or another data processing component. Signals may be stored using various storage devices, such as volatile or non-volatile media and memory devices. In some embodiments, operational signals and measurement signals may be transmitted from processing module 206 to computing subsystem 110 through a wireless connection, either instead of or in addition to connector 210. Wireless connections may be implemented using various modules, for example, communications modules that transmit and receive acoustic or electromagnetic signals.

Figure 4:
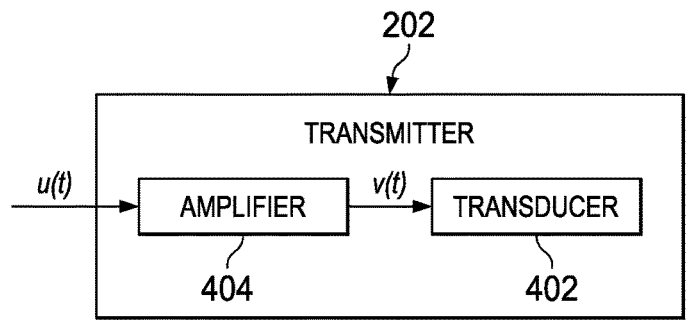
FIG. 4 shows an example transmitter module.

As described above, transmitter module 202 can be a transmitter capable of providing acoustic energy. Referring to FIG. 4, in an example implementation, transmitter module 202 can include a signal amplifier 404 and an electromagnetic transducer 402. Amplifier 404 receives an digital signal $u(t)$ (i.e., a "drive pulse" having particular time-varying voltage characteristics), for example from computer subsystem 110, and converts and amplifies this signal to produce analog voltage waveform $v(t)$. Voltage $v(t)$ is applied to the transducer 402.

Transducer 402 (in some applications referred to as a "shaker") is a device that converts electromagnetic energy (e.g., voltage $v(t)$) into periodic translational motion. This periodic translational motion shifts the medium surrounding the transducer 402 (e.g., air or liquid), resulting in acoustic energy that propagates through the medium and into the surrounding well casing and subterranean region. For example, in some implementations, the transmitter module 202 includes a transducer 402 that applies translational motion onto the drilling fluid of the wellbore, causing acoustic energy (e.g., an acoustic pressure wave) of a particular desired frequency range and amplitude to propagate out of the transmitter module, through the drilling fluid, and into the surrounding media. Transmitter module 202 can include one or more different types of transducers 402, for example a piezoelectric transducer, an electromagnetic acoustic transducer (EMAT), a magnetostrictive transducer, or another type of transducer.

The acoustic energy induced by the transmitter module 202 is dependent on several factors. In some implementations, the induced acoustic energy is dependent on the electromagnetic energy input into the transmitter module 202 (e.g., the drive pulse $u(t)$), the response behavior of the transmitter module 202, and the operating conditions of the transmitter module 202 (e.g., the mass and other physical properties of the medium being moved by the transducer, the operating temperature, and so forth). Variation in one or more of these factors can result in a corresponding variation in the induced acoustic signal. Thus, in some implementations, a desired acoustic signal can be produced by applying an appropriately selected input signal to the transmitter module 202, while accounting for other factors that influence the output of the transmitter module 202.

Figure 5:
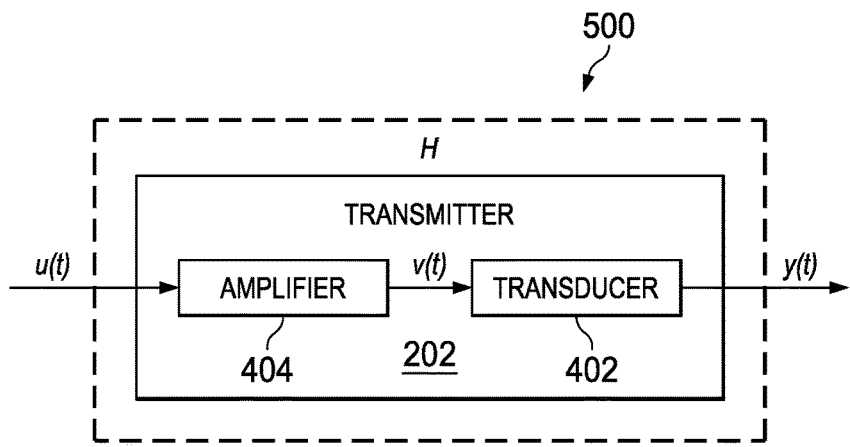
FIG. 5 shows an example relationship between a transmitter module, an input drive pulse, and a pressure output.

The relationship between an input signal and its corresponding output acoustic signal can be approximated by a mathematical model. For instance, FIG. 5 shows a high-level relationship 500 between a drive pulse $u(t)$ and the resulting acoustic signal (e.g., the acoustic pressure output) $y(t)$ produced by the transmitter module 202. As shown in FIG. 5, the function H denotes the mapping from the drive pulse $u(t)$ to the acoustic pressure output $y(t)$ produced by the transmitter module 202. Thus, the drive pulse $u(t)$ can be selected or designed based on function H, such that the output pressure $y(t)$ has desirable features (e.g., a given spectral composition and pressure levels). More formally, it can be said that drive pulse $u(t)$ can be determined such that the response $y(t)$ is equal to (or approximately equal to) a target response $y^*(t)$, where $y(t)=H[u(t)]$.

In some implementations, a mathematical model for the mapping function H can be obtained. This can be obtained experimentally (e.g., by measuring the pressure output to an impulse drive pulse), theoretically (e.g., by applying physics principles to estimate the behavior of the transmitter module), or using a combination of experimental and theoretical approaches.

Figure 6:
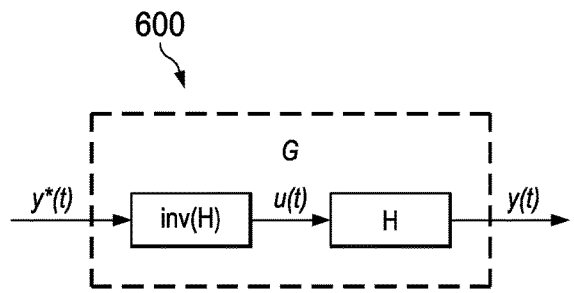
FIG. 6 an example relationship between a transmitter module, an input drive pulse, a pressure output, and a filter.

Assuming that a mathematical model for the "inverse" of H (denoted by $H^{-1}$ or inv(H)) can also be obtained, the drive pulse u(t) that outputs the target pressure y*(t) can be obtained by passing a signal equal to the target pressure y*(t) through an analog or digital "filter" inv (H). An example representation 600 of this relationship is shown in FIG. 6. As shown in FIG. 6, if a perfect inverse for H can be found, the combination of H and inv(H) (denoted by G) becomes identity (i.e., G=1). In some implementations, however, it may difficult to realize inv (H), for example because the exact inverse of H may become non-causal. Thus, in some implementations, inv (H) is instead approximated, which implies that G is close to identity, but not exactly identity.

Figure 7:
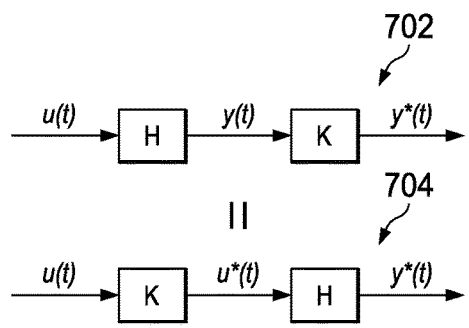
FIG. 7 shows example relationships between a transmitter module, an input drive pulse, a pressure output, and a filter.

In some implementations, an initial drive pulse u(t) giving a pressure output y(t) close to the desired output y*(t) is already available. In these cases, it may be preferable to use u(t) as starting point and "fine tune" u(t) such that the output pressure y(t) becomes y*(t). For example, referring to FIG. 7, representation 702 shows an initial drive pulse u(t) that is input into the transmitter module (denoted mathematically as function H), resulting in a pressure output of y(t). In order to output the desired output y*(t), a "filter" (denoted mathematically as function K) can be applied to y(t), transforming y(t) to y*(t). Assuming K and H can be commuted (i.e., K[H[u(t)]]=H[K[u(t)]], which is true if K and H are linear-time invariant systems), representation 702 can be transformed into an equivalent representation 704. In representation 704, an initial drive pulse u(t) is applied to the filter K, resulting in the fine-tuned pulse u*(t). The fine-tuned drive pulse u*(t) is in turn applied to the transmitter module H, resulting in the desired output y*(t). In this manner, a filter K can be developed by applying a drive pulse to a transmitter module, observing the difference between a pressure output and a desired pressure output, and determining an appropriate filter that transforms the pressure output to the desired pressure output. This developed filter can then be used to modify future drive pulses (i.e., modify the spectral composition of a drive pulse's waveform) in order to produce the desired pressure output.

While representation 704 shows that a drive pulse u(t) is modified by a filter K to result in a tuned pulse u*(t), drive pulse u(t) need not be actually generated. For example, in some implementations, drive pulse u(t) can be a simulated drive pulse (e.g., a proposed drive pulse or simulated drive pulse having pre-determined characteristics), and the simulated drive pulse is modified by filter K (e.g., through numerical or theoretical calculation) to result in a modified simulated drive pulse u*(t). This simulated drive pulse u*(t) can then be generated and applied directly to the transmitter module H. In this manner, intermediate drive pulses need not be generated, and filter K can be used to design an ideal drive pulse based on simulations, before the drive pulse is actually generated.

Figure 8:
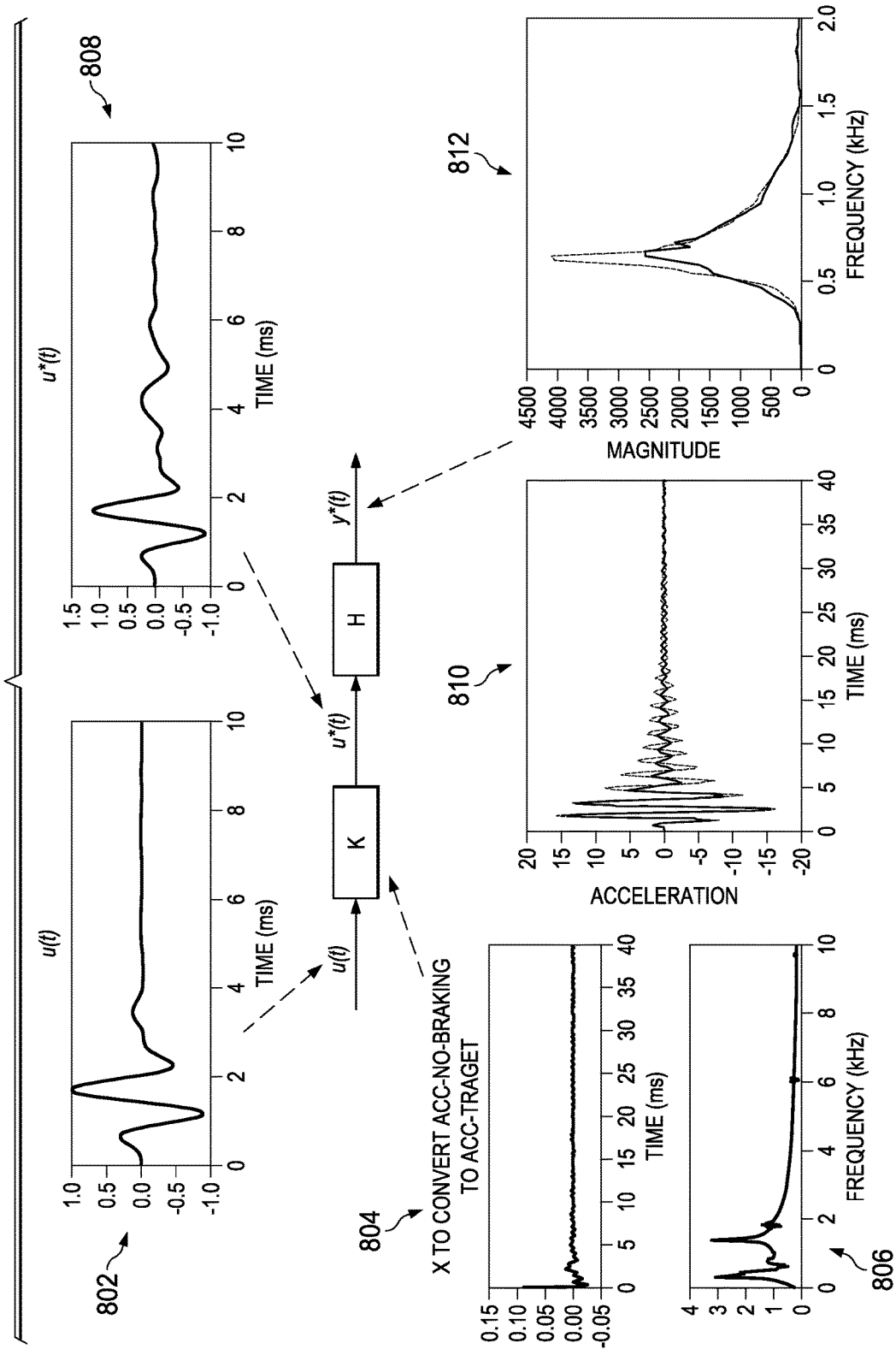
FIG. 8 shows an example implementation of a relationship shown in FIG. 7.

An example implementation is shown in FIG. 8. In this example, an initial drive pulse u(t) (shown in plot 802) is applied to the filter K (shown in plots 804 and 806 as the time response (i.e., impulse response) and frequency response of the filter K, respectively). Filter K modifies drive pulse u(t) (i.e., modifies the spectral composition of the drive pulse's waveform), resulting in modified drive pulse u*(t) (shown in plot 808). Modified drive pulse u*(t) is then applied to the transmitter module H, resulting in the desired pressure output y*(t). By first applying the initial drive pulse u(t) through an appropriately selected filter K, the resulting pressure output y*(t) (shown as solid lines in plots 810 and 812) exhibits a lesser degree of ringing than the output had the initial drive pulse u(t) been applied directly to the transmitter module (shown as dashed lines in plots 810 and 812). Thus, an appropriate filter can be used to adjust the initial drive pulse based on desired characteristics of the outputted acoustic signal, for example a lesser degree of ringing.

Figure 9:
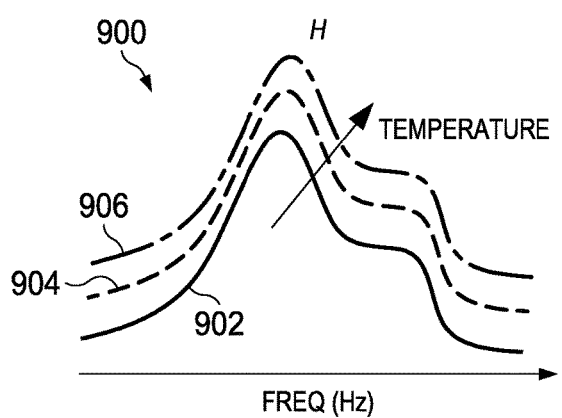
FIG. 9 shows an example change in frequency response of a transmitter module.

Implementations of the above approach can be thought of as "open loop" in nature. That is, the transformation used to generate the desired drive pulse (e.g., transformation inv (H) or K) is computed once and it not updated to account for subsequent variations in the transmitter module (e.g., variations in the transducer or amplifier), ambient conditions, or other factors, which can cause y(t) to depart from y*(t). As an example, a rise in temperature can change the behavior of a transmitter module in response to an applied drive pulse. As shown in plot 900 of FIG. 9, when the temperature of an example transmitter module is increased, the frequency response of the transmitter module (denoted above as H) can change accordingly, for example from frequency response 902 to response 904 or 906 as the temperature is increased.

Figure 10:
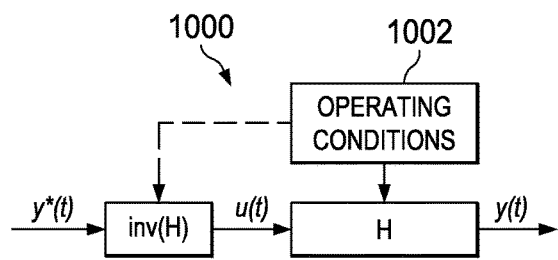
FIG. 10 shows an example relationship between a transmitter module, an input drive pulse, a pressure output, and a filter according to a feed forward control scheme.

A "feed-forward" control scheme can be used to account for these differences. A feed-forward control scheme assumes that a variation in condition that influences the pressure response (i.e., a "disturbance") can be measured, and the effect of this disturbance can be cancelled or mitigated. An example feed-forward control scheme is shown as representation 1000 in FIG. 10. Representation 1000 is similar to representation 600 in FIG. 6, in which the drive pulse u(t) that outputs the target pressure y*(t) can be obtained by passing a signal equal to the target pressure y*(t) through a filter inv(H). However, in representation 1000, function H is influenced by one or more operating conditions 1002. Thus, in order to account for the effects of operating conditions 1002 on function H, operating conditions 1002 can be measured or estimated, and used to modify filter inv(H). In this manner, filter inv(H) can be modified to account for variations in condition that influence the pressure response of the transmitter module.

Operating conditions 1002 can include any condition that affects the operation of the transmitter module. For instance, in some implementations, operating conditions can include one or more conditions of the subterranean region that is proximate to the transmitter module or acoustic transducer. As an example, in some implementations, operating conditions can include the temperature, the pressure, or the composition (e.g., the type of material) of the region surrounding or near to the transmitter module or transducer. A subterranean region that is proximate to the transmitter module or acoustic can be, for example, a region that surrounds the transmitter module or transducer, a region that is immediately adjacent to the transmitter module or transducer, a region that is relatively close to the transmitter module or transducer (e.g., approximately 10 feet or less), or a region that is more distant from the transmitter module or transducer but is presumed to be a good representation of the region that surrounds, or lies adjacent near to the transmitter module or transducer. This information can be measured in a variety of ways. For example, appropriate sensors can be used to directly measure one or more of these conditions. In another example, sensors can be used to indirectly measure another property, and the measured property can be used as an estimator that approximates the operating condition.

These measurements or estimates can be obtained continuously, periodically, or intermittently. For example, measurements can be obtained continuously throughout the use of logging tool 102, periodically (e.g., every 1 minute, 5 minutes, or 10 minutes), or intermittently (e.g., after arbitrary amounts of time). In some implementations, measurements can be initiated by a user, for example a user operating computer subsystem 110.

Filter inv(H) can also be modified continuously, periodically, or intermittently. For example, filter inv(H) can be modified continuously throughout the use of logging tool 102, periodically (e.g., every 1 minute, 5 minutes, or 10 minutes), or intermittently (e.g., after arbitrary amounts of time). Modification of filter inv (H) can occur in real-time, near-real time, or after a particular length of time. In some implementations, filter inv(H) can be modified after a measurement or estimate is made, or before logging tool 102 is used (e.g., to "calibrate" logging tool 102 for use in a particular environment). In some implementations, filter inv (H) can be "modified" by selecting an appropriate filter inv(H) from among a predetermined set of possible filters based on the measurements or estimates. This can be beneficial in some implementations, as it may reduce the amount of computation required to modify filter inv(H). In some implementations, filter inv(H) can be modified according to numerical or theoretical calculations, and can be retained for future retrieval and use, such that calculations need not be repeated for a given set of measurements or estimates.

In some implementations, it is possible to measure the pressure output by the transmitter module 202 in order to produce feedback regarding the operation of the transmitter module 202. This measured pressure output can be compared against the desired pressure output in order to modify the filter inv (H) used to generate the drive pulse u(t). An example "feedback" control scheme is shown as representation 1100 in FIG. 11. Representation 1100 is similar to representation 1000 in FIG. 10, in which the function H is influenced by operating conditions 1002 and the drive pulse u(t) that outputs the target pressure y*(t) can be obtained by passing a signal equal to the target pressure y*(t) through a filter inv(H). However, instead of using measurements or estimates of operating conditions 1002 to modify filter inv (H), filter inv (H) is instead modified by a measurement or estimate of pressure output y(t). In this manner, filter inv(H) can be modified to account for variations in condition that influence the pressure response of the transmitter module, without the need to measure or estimate these conditions.

Figure 12:
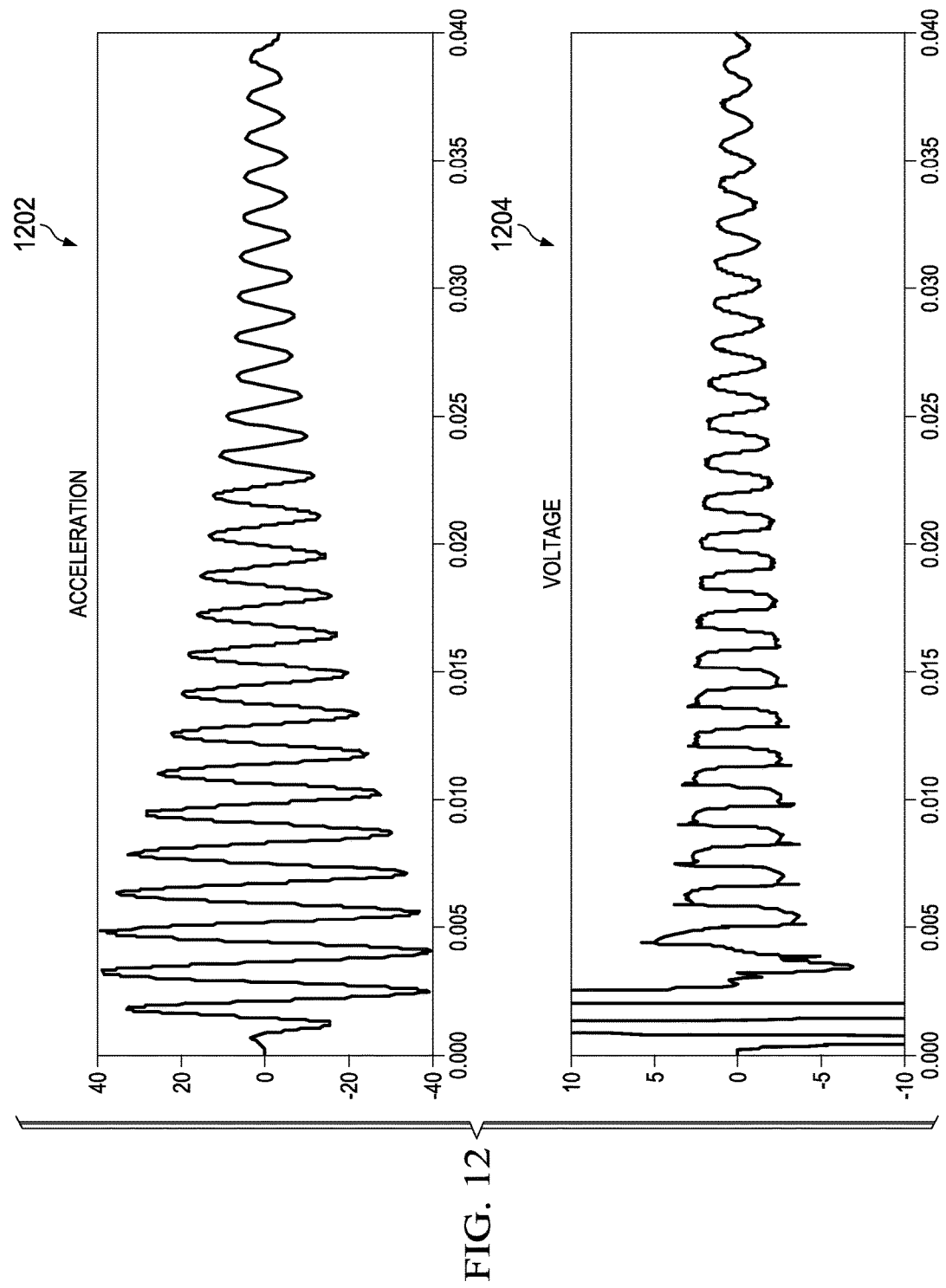
FIG. 12 shows an example correlation between an amplifier back EMF and the mechanical shake response of a transmitter module's transducer

The pressure output y(t) can be measured in a variety of ways. In an example, pressure sensors can be used to directly measure the pressure output. In another example, sensors can be used to indirectly measure another property, and the measured property can be used as an estimator that approximates the pressure output. Various properties are highly correlated with pressure and can be used as an estimator for the pressure output. For example, properties can include the acceleration of the transducer (e.g., as measured using an accelerometer attached to the transducer structure), the amplifier back electromagnetic force (EMF) (e.g., as measured on the high-voltage circuit of the amplifier), and the pressure at the receivers (which are part of the acoustic tool and measure pressure coming through the subterranean formation/mud). These measured signals can be used to drive an estimator (e.g., a Kalman filter, classical state observer system, or other estimator) in order to obtain an estimate, or can be used directly as the estimate (with some appropriate scaling) for the pressure output. In an example implementation, as shown in FIG. 12, the amplifier back EMF (plot 1024) correlates well with the mechanical shake response (i.e., the acceleration) of the transmitter module's transducer 402 (plot 1202). Thus, as an example, the amplifier back EMF can be used to estimate the pressure output of the transmitter module 202.

Figure 11:
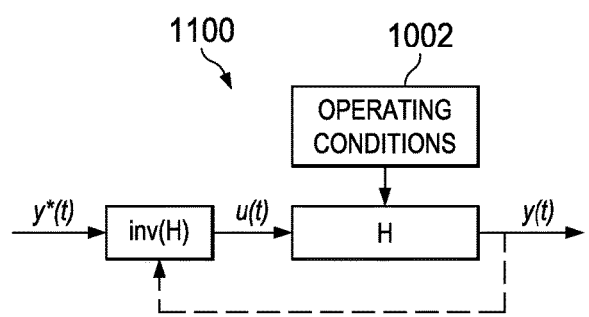
FIG. 11 shows an example relationship between a transmitter module, an input drive pulse, a pressure output, and a filter according to a feedback control scheme.
Figure 13:
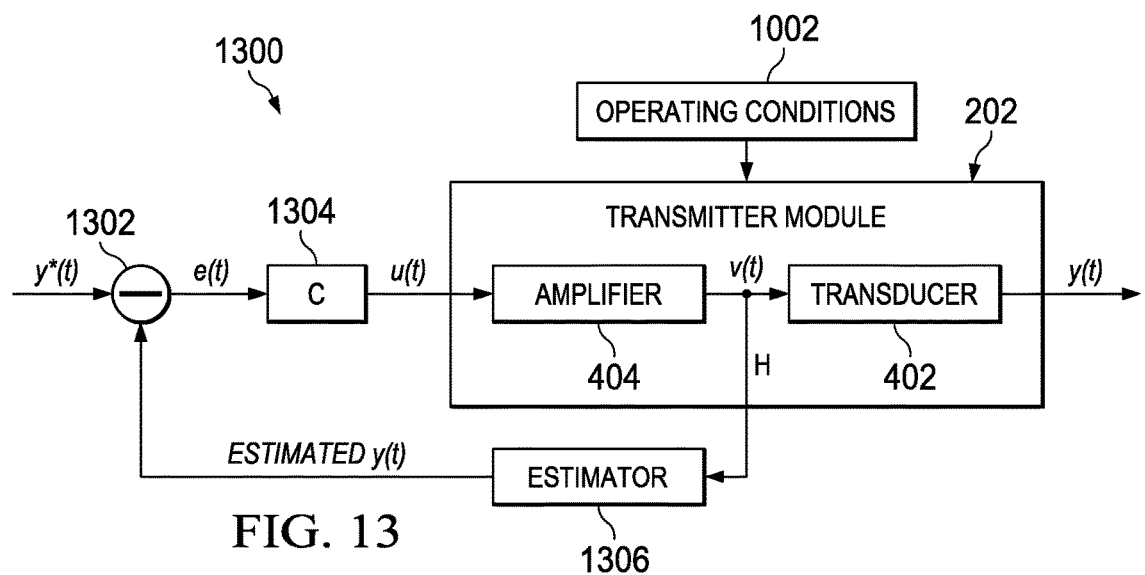
FIG. 13 shows an example implementation of a feedback control scheme.

The representation 1100 shown in FIG. 11 can be implemented in a variety of ways. An example implementation 1300 is shown in FIG. 13. In this example, the filter inv(H) filter can be implemented by taking the estimated value of pressure output y(t) of a transmitter module 202, and comparing it against the target pressure y*(t) using a subtractor 1302. The estimated value of y(t) is obtained from an estimator 1306, which provides an estimated y(t) based onto a signal v(t). Signal v(t) can be, for example, information regarding the pressure output y(t), or information that is correlated to pressure output y(t), as discussed above (e.g., the back EMF of amplifier 404 of transmitter module 202).

Subtractor 1302 subtracts the target pressure y*(t) from the estimated of y(t) to obtain the tracking error e (t), and the tracking error e(t) is filtered by a compensator 1304 (represented mathematically as function C). Compensator 1304 can be implemented, for example, using a proportional-integral-derivative (PID) controller.

The filtered signal u(t) is then applied as a driving pulse to the transmitter module H. In response to the driving pulse u(t) and the operating conditions 1002, transmitter module H produces pressure output y(t). Estimator 1306 can subsequently make additional estimates regarding pressure output y(t), and these estimates can be again used to modify or update the drive pulse u(t) that is applied to the transmitter module.

In the "closed loop" described above, it is desirable for the mapping from y*(t) to y(t) to be approximately 1.

As above, measurements or estimates of y(t) can be obtained continuously, periodically, or intermittently. For example, measurements or estimates can be obtained continuously throughout the use of logging tool 102, periodically (e.g., every 1 minute, 5 minutes, or 10 minutes), or intermittently (e.g., after arbitrary amounts of time). In some implementations, measurements or estimates can be obtained before, during, or after use of logging tool 102 (e.g., before logging tool 102 is used to produce a particular acoustic wave, while logging tool 102 is used to produce a particular acoustic wave, or after logging tool 102 is used to produce a particular acoustic wave). In some implementations, measurements can be initiated by a user, for example a user operating computer subsystem 110.

Driving pulse u(t) can also be updated continuously, periodically, or intermittently. For example, driving pulse u(t) can be updated continuously throughout the use of logging tool 102, periodically (e.g., every 1 minute, 5 minutes, or 10 minutes), or intermittently (e.g., after arbitrary amounts of time). Driving pulse u(t) can be updated in real-time, near-real time, after a particular length of time, or according to other criteria. In some implementations, driving pulse u(t) can be updated after a measurement or estimate is made, before logging tool 102 is used (e.g., to "calibrate" logging tool 102 for use in a particular environment), or after logging tool 102 is used (e.g., to "calibrate" logging tool 102 for future use).

Figure 14:
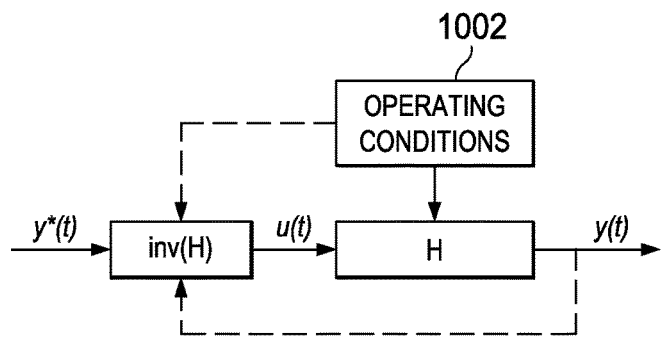
FIG. 14 shows an example relationship between a transmitter module, an input drive pulse, a pressure output, and a filter according to a combined feed forward and feedback control scheme.

In some implementations, "feed forward" and "feedback" control schemes can be combined. For example, as shown in representation 1400 of FIG. 14, filter inv(H) can be modified based on measurements or estimates of operating conditions 1002, as well as measurements or estimates of pressure output y(t). In an example implementation, inv(H) can be modified based on a measurement of the temperature of the subterranean region and a measurement back EMF in the amplifier 404 of the transmitter module 202.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, filters K and inv(H) can be calculated or implemented using digital electronic circuitry, or in computer software, firmware, or hardware, or in combinations of one or more of them. In another example, compensator 1304 and estimator 1306 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. For example, in some implementations, the analysis, adjustment, and control of a drive pulse can be implemented in a control module, and the acquisition and analysis of logging information can be implemented in a logging module. While different modules are described, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

Various aspects of the invention are summarized as follows.

In general, in an aspect, an acoustic logging method includes producing an acoustic signal using a transmitter module that includes an acoustic transducer, controlling a response of the acoustic transducer by adjusting a drive pulse applied to the transmitter module in order to reduce a difference between the produced acoustic signal and a desired acoustic signal, after adjusting the drive pulse, directing the produced acoustic signal towards a subterranean region, and acquiring an acoustic log for the subterranean region based on measurements of a returning acoustic signal returning from the subterranean region in response to the produced acoustic signal. The adjustment of the drive pulse is based on at least one of an oscillation or a ringing of the produced acoustic signal or the returning acoustic signal, a condition of the subterranean region proximate to the acoustic transducer, and an estimate of the difference between the produced acoustic signal and the desired acoustic signal.

Implementations of this aspect may include one or more of the following features:

In some implementations, the drive pulse can be adjusted before it is applied to the transducer. In some implementations, the drive pulse can be adjusted while it is being applied to the transducer.

In some implementations, the method can further include producing a second acoustic signal using the transmitter module, and controlling the response of the acoustic transducer by adjusting a second drive pulse applied to the transmitter module in order to reduce a difference between the second produced acoustic signal and a second desired acoustic signal. The adjustment can be based on the adjustment of the first drive current and at least one of an oscillation or a ringing of the second produced acoustic signal or a second returning acoustic signal returning from the subterranean region in response to the second produced acoustic signal, the condition of the subterranean region proximate to the acoustic transducer, and an estimate of the difference between the second produced acoustic signal and the second desired acoustic signal.

In some implementations, adjusting the drive pulse can include modifying a waveform corresponding to the drive pulse. Modifying the waveform can include modifying a spectral composition of the waveform. Modifying the waveform can include modifying an amplitude of the waveform.

In some implementations, the condition can be a temperature of the subterranean region proximate to the acoustic transducer. In some implementations, the condition can be a pressure in the subterranean region proximate to the acoustic transducer. In some implementations, the condition can be a composition of the subterranean region proximate to the acoustic transducer.

In some implementations, the drive pulse can be adjusted a plurality of times while it is being applied to the transducer.

The drive pulse can be adjusted periodically during operation of the acoustic transducer. The drive pulse adjustment can be initiated based on input from a user. The drive pulse can include an electric waveform defined by time-varying voltage or time-varying current.

In some implementations, the transmitter module can further include an amplifier, and the estimate of the difference can be based on information corresponding to a back electromotive force (EMF) of the amplifier.

In some implementations, the method can further include producing a second acoustic signal using the transmitter module, and adjusting a second drive pulse applied to the transmitter module based on a response of the transmitter module to the adjustment of the first drive pulse applied to the transmitter module.

In some implementations, the adjustment includes a feed forward control scheme. In some implementations, the adjustment includes a feed-back control scheme.

In general, in another aspect, an acoustic logging system includes a transmitter module including an acoustic transducer, where the transmitter module is configured to produce an acoustic signal. The system also includes a control module, wherein the control module is configured to control a response of the acoustic transducer by adjusting a drive pulse applied to the transmitter module in order to reduce a difference between the produced acoustic signal and a desired acoustic signal. The system also includes a logging module configured to acquire an acoustic log for a subterranean region based on measurements of a returning acoustic signal returning from the subterranean region in response to the produced acoustic signal. The adjustment of the drive pulse is based on at least one of an oscillation or a ringing of the produced acoustic signal or the returning acoustic signal, a condition of the subterranean region proximate to the acoustic transducer, and an estimate of the difference between the produced acoustic signal and the desired acoustic signal.

Implementations of this aspect may include one or more of the following features:

In some implementations, the control module can be configured to adjust the drive pulse before it is applied to the transducer. The control module can be configured to adjust the drive pulse while it is being applied to the transducer.

In some implementations, the transmitter module can be configured to produce an second acoustic signal, and the control module can be configured to control the response of the acoustic transducer by adjusting a second drive pulse applied to the transmitter module in order to reduce a difference between the second produced acoustic signal and a second desired acoustic signal. The adjustment can be based on the adjustment of the first drive current and at least one of an oscillation or a ringing of the second produced acoustic signal or a second returning acoustic signal returning from the subterranean region in response to the second produced acoustic signal, the condition of the subterranean region proximate to the acoustic transducer, and an estimate of the difference between the second produced acoustic signal and the second desired acoustic signal.

In some implementations, the control module can be configured to adjust the drive pulse by modifying a waveform corresponding to the drive pulse. Modifying the waveform can include modifying a spectral composition of the waveform. Modifying the waveform can include modifying an amplitude of the waveform.

In some implementations, the condition can be a temperature of the subterranean region proximate to the acoustic transducer. In some implementations, the condition can be a pressure in the subterranean region proximate to the acoustic transducer. In some implementations, the condition can be a composition of the subterranean region proximate to the acoustic transducer.

In some implementations, the control module can be configured to adjust the drive pulse a plurality of times while it is being applied to the transducer. The control module can be configured to adjust the drive pulse periodically during operation of the acoustic transducer. The control module can be configured to initiate adjustment of the drive pulse adjustment based on input from a user. The drive pulse can include an electric waveform defined by time-varying voltage or time-varying current.

In some implementations, the system can further include an amplifier, and the control module can be configured to estimate the difference between the produced acoustic signal and the desired acoustic signal based on information corresponding to a back electromotive force (EMF) of the amplifier.

In some implementations, the transmitter module can be configured to produce a second acoustic signal, and the control module can be configured to adjust a second drive pulse applied to the transmitter module based on a response of the transmitter module to the adjustment of the first drive pulse applied to the transmitter module.

In some implementations, the adjustment can include a feed forward control scheme. In some implementations, the adjustment can include a feedback control scheme.

Implementations of these control schemes can provide various benefits. For example, in some implementations, the frequency response of a transmitter module (often referred to as the Transmitter Voltage Response (TVR)) may have one or more natural resonant frequencies within the frequency range of operation. In open-loop control, after a pre-determined drive signal stops, the transmitter module can continue oscillating or "ringing" at its resonant frequencies, which can be reflected as ring-down in a later time of the output signal. Implementations of the above can be used to reduce this oscillation or ringing. In a similar manner, implementations can be used to provide acoustic energy with other desired characteristics, reduce undesired characteristics in the produced acoustic energy, or adjust the operation of the transmitter module in response to static or dynamic changes. For instance, in an example, the frequency response of a transmitter module can change due to changes to the operating condition (e.g., environmental factors), or change gradually over a period of time as the transmitter module ages and exhibits different operating characteristics. Implementations of the above can be used to account for these changes. In addition, many of these control schemes can be implemented, either partially or completely, in software, and can be relatively inexpensive to implement.

Accordingly, other embodiments are within the scope of the following claims.

What is claimed is:

1. An acoustic logging method, comprising:
   producing an acoustic signal using a transmitter module comprising an acoustic transducer;
   controlling a response of the acoustic transducer by adjusting a drive pulse applied to the transmitter module in order to reduce a difference between the produced acoustic signal and a desired acoustic signal, wherein adjusting the drive pulse comprises modifying a waveform corresponding to the drive pulse, and wherein modifying the waveform comprises modifying a spectral composition of the waveform or modifying an amplitude of the waveform;
   after adjusting the drive pulse, directing the produced acoustic signal towards a subterranean region; and
   acquiring an acoustic log for the subterranean region based on measurements of a returning acoustic signal returning from the subterranean region in response to the produced acoustic signal;
   wherein the adjustment of the drive pulse is based on at least one of:
      an oscillation or a ringing of the produced acoustic signal or the returning acoustic signal;
      a condition of the subterranean region proximate to the acoustic transducer; and
      an estimate of the difference between the produced acoustic signal and the desired acoustic signal.

2. The method of claim 1, wherein the drive pulse is adjusted before it is applied to the transducer.

3. The method of claim 1, wherein the drive pulse is adjusted while it is being applied to the transducer.

4. The method of claim 3, wherein the drive pulse is adjusted a plurality of times while it is being applied to the transducer.

5. The method of claim 1, further comprising:
   producing a second acoustic signal using the transmitter module; and
   controlling the response of the acoustic transducer by adjusting a second drive pulse applied to the transmitter module in order to reduce a difference between the second produced acoustic signal and a second desired acoustic signal;
   wherein the adjustment is based on the adjustment of the drive pulse and at least one of:
      an oscillation or a ringing of the second produced acoustic signal or a second returning acoustic signal returning from the subterranean region in response to the second produced acoustic signal;
      the condition of the subterranean region proximate to the acoustic transducer; and
      an estimate of the difference between the second produced acoustic signal and the second desired acoustic signal.

6. The method of claim 1, wherein the condition is a temperature of the subterranean region proximate to the acoustic transducer, a pressure in the subterranean region proximate to the acoustic transducer, or a composition of the subterranean region proximate to the acoustic transducer.

7. The method of claim 1, wherein the drive pulse is adjusted periodically during operation of the acoustic transducer.

8. The method of claim 1, wherein the drive pulse adjustment is initiated based on input from a user.

9. The method of claim 1, wherein the transmitter module further comprises an amplifier, and wherein the estimate of the difference is based on information corresponding to a back electromotive force (EMF) of the amplifier.

10. The method of claim 1, further comprising:
    producing a second acoustic signal using the transmitter module; and
    adjusting a second drive pulse applied to the transmitter module based on a response of the transmitter module to the adjustment of the first drive pulse applied to the transmitter module.

11. The method of claim 1, wherein the adjustment comprises a feed forward control scheme or a feedback control scheme.

12. The method of claim 1, wherein the drive pulse is adjusted in real time.

13. The method of claim 1, wherein the adjusting of the drive pulse is based on a back electromagnetic force (EMF) as measured by an amplifier of the transmitter module.

14. An acoustic logging system, comprising:
a transmitter module comprising an acoustic transducer, wherein the transmitter module is configured to produce an acoustic signal;
a control module, wherein the control module is configured to control a response of the acoustic transducer by adjusting a drive pulse applied to the transmitter module in order to reduce a difference between the produced acoustic signal and a desired acoustic signal by modifying a waveform corresponding to the drive pulse, and wherein modifying the waveform comprises modifying a spectral composition of the waveform or modifying an amplitude of the waveform; and
a logging module configured to acquire an acoustic log for a subterranean region based on measurements of a returning acoustic signal returning from the subterranean region in response to the produced acoustic signal;
wherein the adjustment of the drive pulse is based on at least one of:
an oscillation or a ringing of the produced acoustic signal or the returning acoustic signal;
a condition of the subterranean region proximate to the acoustic transducer; and
an estimate of the difference between the produced acoustic signal and the desired acoustic signal.

15. The system of claim 14, wherein the control module is configured to adjust the drive pulse before it is applied to the transducer.

16. The system of claim 14, wherein the control module is configured to adjust the drive pulse while it is being applied to the transducer.

17. The system of claim 14, wherein:
the transmitter module is configured to produce an second acoustic signal; and
the control module is configured to control the response of the acoustic transducer by adjusting a second drive pulse applied to the transmitter module in order to reduce a difference between the second produced acoustic signal and a second desired acoustic signal;
wherein the adjustment is based on the adjustment of the drive pulse and at least one of:
an oscillation or a ringing of the second produced acoustic signal or a second returning acoustic signal returning from the subterranean region in response to the second produced acoustic signal;
the condition of the subterranean region proximate to the acoustic transducer; and
an estimate of the difference between the second produced acoustic signal and the second desired acoustic signal.

18. The system of claim 17, wherein the control module is configured to adjust the drive pulse a plurality of times while it is being applied to the transducer.

19. The system of claim 14, wherein the condition is a temperature of the subterranean region proximate to the acoustic transducer, a pressure in the subterranean region proximate to the acoustic transducer, or a composition of the subterranean region proximate to the acoustic transducer.

20. The system of claim 14, wherein the control module is configured to adjust the drive pulse periodically during operation of the acoustic transducer.

21. The system of claim 14, wherein the control module is configured to initiate adjustment of the drive pulse adjustment based on input from a user.

22. The system of claim 14, wherein the transmitter module further comprises an amplifier, and wherein the control module is configured to estimate the difference between the produced acoustic signal and the desired acoustic signal based on information corresponding to a back electromotive force (EMF) of the amplifier.

23. The system of claim 14, wherein:
the transmitter module is configured to produce a second acoustic signal; and
the control module is configured to adjust a second drive pulse applied to the transmitter module based on a response of the transmitter module to the adjustment of the first drive pulse applied to the transmitter module.

24. The system of claim 14, wherein the adjustment comprises a feed forward control scheme or a feedback control scheme.

25. The system of claim 14, wherein the drive pulse is adjusted in real time.

26. The system of claim 14, wherein the adjusting of the drive pulse is based on a back electromagnetic force (EMF) as measured by an amplifier of the transmitter module.

* * * * *